(12) United States Patent
O'Leary (10) Patent No.: US 11,630,031 B2
(45) Date of Patent: Apr. 18, 2023

(54) ENGINE-MOUNTED INSTRUMENTATION ASSEMBLY

(71) Applicant: Rolls-Royce North American Technologies Inc., Indianapolis, IN (US)

(72) Inventor: Mark O'Leary, Zionsville, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 0 days.

(21) Appl. No.: 17/362,311

(22) Filed: Jun. 29, 2021

(65) Prior Publication Data

US 2022/0412841 A1    Dec. 29, 2022
US 2022/0412841 A1    Dec. 29, 2022

(51) Int. Cl.

| | |
|---|---|
| *G01M 15/14* | (2006.01) |
| *F01D 17/24* | (2006.01) |
| *G01M 17/02* | (2006.01) |
| *F01D 21/00* | (2006.01) |
| *F01D 25/28* | (2006.01) |
| *G01M 15/02* | (2006.01) |

(52) U.S. Cl.
CPC ............. *G01M 15/14* (2013.01); *F01D 17/24* (2013.01); *F01D 21/003* (2013.01); *F01D 25/285* (2013.01); *G01M 15/02* (2013.01); *G01M 17/02* (2013.01); *F05D 2260/31* (2013.01); *F05D 2260/83* (2013.01)

(58) Field of Classification Search
CPC ..... G01M 15/02; G01M 15/14; F01D 25/285; F05D 2260/83
See application file for complete search history.

(56) References Cited

U.S. PATENT DOCUMENTS

| | | | | |
|---|---|---|---|---|
| 4,584,531 | A * | 4/1986 | Couch ................. | G01N 27/626 324/464 |
| 5,106,203 | A * | 4/1992 | Napoli ................. | F01D 17/085 374/E13.006 |
| 6,595,062 | B1 * | 7/2003 | Luke ................... | G01L 19/0092 73/714 |
| 6,642,720 | B2 | 11/2003 | Maylotte et al. | |
| 8,944,678 | B2 | 2/2015 | Snider et al. | |
| 9,116,055 | B2 * | 8/2015 | Johnston ............ | G01K 11/3206 |
| 9,207,128 | B2 * | 12/2015 | McCarthy .......... | G01K 11/3206 |
| 10,684,183 | B2 * | 6/2020 | Burgan ................ | G01M 15/02 |
| 10,697,316 | B2 | 6/2020 | Boyd | |
| 10,982,561 | B2 * | 4/2021 | Vo .......................... | F01D 25/24 |

(Continued)

FOREIGN PATENT DOCUMENTS

KR    20-2010-0004831    5/2010

*Primary Examiner* — Eric S. McCall
(74) *Attorney, Agent, or Firm* — Barnes & Thornburg LLP (57) ABSTRACT

An instrumentation assembly configured to measure properties of an engine exhaust stream is disclosed in this paper. The instrumentation assembly may include an outer support ring that extends around a central axis, an inner support ring arranged radially inward of the outer support ring around the central axis, and a plurality of instrumentation rake assemblies. The plurality of instrumentation rake assemblies extends from the outer support ring to the inner support ring across an annular passageway defined between the outer support ring and the inner support ring configured to carry the engine exhaust stream.

20 Claims, 6 Drawing Sheets

(56) References Cited

U.S. PATENT DOCUMENTS

| | | |
|---|---|---|
| 2002/0122459 A1 | 9/2002 | McFarland et al. |
| 2004/0114665 A1 | 6/2004 | Park et al. |
| 2010/0158074 A1 | 6/2010 | Fortier et al. |
| 2013/0323023 A1* | 12/2013 | McCarthy .............. G01K 13/02 |
| | | 374/161 |
| 2019/0323909 A1 | 10/2019 | Burgan |
| 2019/0331002 A1* | 10/2019 | Eastwood ............. F01D 25/246 |
| 2020/0041353 A1* | 2/2020 | Jackson ................ G01K 13/02 |
| 2020/0103313 A1 | 4/2020 | Kyritsis |
| 2022/0260001 A1* | 8/2022 | Lefebvre .................. F02K 1/78 |

\* cited by examiner

ENGINE-MOUNTED INSTRUMENTATION ASSEMBLY

FIELD OF THE DISCLOSURE

The present disclosure relates generally to gas turbine engines and more specifically to instrumentation systems for measuring the performance of exhaust systems in gas turbine engines.

BACKGROUND

Gas turbine engine exhaust systems direct hot and high velocity air away from the engine. The exhaust section of the engine uses several devices in order to accomplish this. A combination of exhaust pipes, a tail cone, and struts help to direct the flow and increase or decrease the velocity of that flow as desired.

A tail cone on the back of the turbine helps to form a duct in the exhaust system between the tail cone and the exhaust pipe surrounding it. This allows the exhaust to be formed into a converging, diverging, or converging/diverging nozzle. These nozzles can increase the velocity of the exhaust gasses to produce additional thrust or decrease the velocity in order to reduce noise. Struts are used in the gas path in order to support the nozzle and to help straighten the flow through the exhaust.

If the gas turbine engine is a turbofan engine, there may be a mixer to mix the hot core gasses with the cooler bypass air in order to reduce the velocity and temperature of the air. This helps to reduce the noise and heat signature of the engine.

It is often difficult to accurately model the exhaust gasses using computer models and computation fluid dynamics and so it is frequently desired to measure temperatures, pressures and other parameters in the hot, high energy exhaust of these devices. These sensors need to be mounted in a way that allows them to be positioned at various locations throughout the exhaust flow.

Sensors positioned in the exhaust flow allow the test operator and engine designers to evaluate the performance of the devices used in the exhaust system in order to change velocity, temperature, and other parameters. These measurements can be used to improve the design of these components directly or can be input into the computer models used to evaluate and improve these designs.

SUMMARY

The present disclosure may comprise one or more of the following features and combinations thereof.

A propulsion system test stand configured to measure properties of an engine exhaust stream may include a gas turbine engine configured to discharge exhaust gas in an aft direction along a central axis of engine rotation, an exhaust duct arranged radially outward of the central axis of engine rotation, and an engine-mounted instrumentation assembly. The gas turbine engine and the exhaust duct may be configured to discharge exhaust gas in an aft direction along a central axis of engine rotation. The engine-mounted instrumentation assembly may include an outer support ring coupled to the exhaust duct, an inner support ring positioned radially inward of the outer support ring and coupled to the gas turbine engine, and a plurality of instrumentation rake assemblies that extend from the outer support ring to the inner support ring so as to be coupled at both the outer support ring and the inner support ring. This may allow for a field measurement across locations from the outer support ring to the inner support ring. Each of the plurality of instrumentation rake assemblies may include a sensor arm, at least one sensor coupled to the sensor arm, and mount means for coupling the sensor arm to both the outer support ring and the inner support ring. The sensors may be configured to detect properties of the exhaust gas. The sensor arm mount means may accommodate movement of the inner support ring, in the aft direction along the central axis of engine rotation, relative to the outer support ring. The movement of the inner support ring may be caused by thermal expansion of the gas turbine engine along the central axis of engine rotation greater than that of the exhaust duct during operation of the propulsion system test stand.

In some embodiments, the mount means may include an outer pivot connection that supports the sensor arm to pivot about an outer pivot axis tangent to an outer diameter around the central axis of engine rotation. The mount means may also include an inner pivot connection that supports the sensor arm to pivot about an inner pivot axis tangent to an inner diameter around the central axis of engine rotation, the inner diameter being arranged radially inward of the outer diameter.

In some embodiments, the outer pivot connection may include an outer pin that extends along the outer pivot axis and the inner pivot connection may include an inner pin that extends along the inner pivot axis.

In some embodiments, the mount means may further provide for coupling the sensor arm to at least one of the outer support ring and the inner support ring to accommodate radial expansion and contraction of the inner support ring around the central axis of engine rotation relative to the outer support ring. This expansion and contraction may be caused by thermal expansion of the gas turbine engine relative to the central axis of engine rotation greater than that of the exhaust duct during operation of the propulsion system test stand.

In some embodiments, the mount means may include a first slide connection coupled to the sensor arm via a first pivot connection that supports the sensor arm to pivot about a first pivot axis tangent to a first diameter around the central axis of engine rotation. The first slide connection may support the first pivot connection for movement in a radial direction relative to the central axis of engine rotation.

In some embodiments, the first slide connection may include a piston received in a bore formed in one of the outer support ring and the inner support ring.

In some embodiments, the pivot connection may include a pin that extends along the pivot axis.

In some embodiments, the mount means may include a second slide connection coupled to the sensor arm via a second pivot connection that supports the sensor arm to pivot about a second pivot axis tangent to a second diameter around the central axis of engine rotation. The second slide connection may support the second pivot connection for movement in the radial direction relative to the central axis of engine rotation.

In some embodiments, the first slide connection may include a first piston received in a bore formed in the outer support ring. The second slide connection may include a second piston received in a bore formed in the inner support ring.

In some embodiments, the first pivot connection may include a first pin that extends along the first pivot axis. The first pivot axis may be configured to move with the first piston. The second pivot connection may include a second pin that extends along the second pivot axis. The second pivot axis may be configured to move with the second piston.

In some embodiments, the mount means may include an outer pivot connection that supports the sensor arm to pivot about an outer pivot axis tangent to an outer diameter around the central axis of engine rotation and an inner pivot connection that supports the sensor arm to pivot about an inner pivot axis tangent to an inner diameter around the central axis of engine rotation, the inner diameter being arranged radially inward of the outer diameter.

In some embodiments, the outer pivot connection may include an outer pin that extends along the outer pivot axis and an inner pin that extends along the inner pivot axis.

In some embodiments, the exhaust duct may be included as part of an exhaust system and the exhaust system may further include a test article mounted in the exhaust stream which may be configured to affect the flow of the exhaust gas. The engine-mounted instrumentation assembly may be located forward of the test article along the central axis of engine rotation.

In some embodiments a dynamic instrumentation assembly may be located aft of the test article along the central axis of engine rotation and may be configured to measure properties of an engine exhaust stream. The dynamic instrumentation assembly may include an outer support ring coupled to the exhaust duct, an inner support ring positioned radially inward of the outer support ring of the dynamic instrumentation assembly and may be free to move independent of the gas turbine engine. The dynamic instrumentation assembly may also include a plurality of instrumentation rake assemblies that extend from the outer support ring to the inner support ring so as to be coupled at both the outer support ring and the inner support ring, allowing for a field measurement across locations from the outer support to the inner support ring. Each of the plurality of instrumentation rake assemblies may include a sensor arm, at least one sensor coupled to the sensor arm, and mount means for coupling the sensor arm to both the outer support ring and the inner support ring. The sensor may be configured to detect properties of the exhaust gas. The mount means may be configured to accommodate rotation of the sensor arm along an axis extending in the radial direction relative to the central axis of engine rotation so as to enable the sensors to encounter the exhaust air at a desired angle.

According to another aspect of the present disclosure, an instrumentation assembly may be configured to measure properties of an engine exhaust stream. The instrumentation assembly may be comprised of an outer support ring that extends around a central axis, an inner support ring arranged radially inward of the outer support ring around the central axis, and a plurality of instrumentation rake assemblies that extend from the outer support ring to the inner support ring across an annular passageway defined between the outer support ring and the inner support ring. The annular passageway may be configured to carry the engine exhaust stream. Each of the plurality of instrumentation rake assemblies may include a sensor arm, at least one sensor coupled to the sensor arm, an outer pivot connection that supports the sensor arm to pivot about an outer pivot axis tangent to an outer diameter around the central axis, and an inner pivot connection that supports the sensor arm to pivot about an inner pivot axis tangent to an inner diameter around the central axis, the inner diameter being arranged radially inward of the outer diameter.

In some embodiments, the outer pivot connection may include an outer pin that extends along the outer pivot axis and the inner pivot connection may include an inner pin that extends along the inner pivot axis.

According to another aspect of the present disclosure, an instrumentation assembly may be configured to measure properties of an engine exhaust stream. The instrumentation assembly may be comprised of an outer support ring that extends around a central axis, an inner support ring arranged radially inward of the outer support ring around the central axis, and a plurality of instrumentation rake assemblies that extend from the outer support ring to the inner support ring across an annular passageway defined between the outer support ring and the inner support ring. The annular passageway may be configured to carry the engine exhaust stream, Each of the plurality of instrumentation rake assemblies may include a sensor arm, at least one sensor coupled to the sensor arm, a first slide connection coupled to the sensor arm via a first pivot connection that supports the sensor arm to pivot about a first pivot axis tangent to a first diameter around the central axis. The first slide connection may support the first pivot connection for movement in a radial direction relative to the central axis.

In some embodiments, the first slide connection may include a piston received in a bore formed in one of the outer support ring and the inner support ring. The pivot connection may include a first pin that extends along the first pivot axis Some embodiments may include a second slide connection coupled to the sensor arm via a second pivot connection that supports the sensor arm to pivot about a second pivot axis tangent to a second diameter around the central axis. The second slide connection may support the second pivot connection for movement in the radial direction relative to the central axis.

In some embodiments, the first slide connection may include a first piston received in a bore formed in the outer support ring. The first pivot connection may include a first pin that extends along the first pivot axis. The second slide connection may include a second piston received in a bore formed in the inner support ring. The second pivot connection may include a second pin that extends along the second pivot axis.

These and other features of the present disclosure will become more apparent from the following description of the illustrative embodiments.

BRIEF DESCRIPTION OF THE DRAWINGS

FIG. 3a and FIG. 3b are a pair of cutaway views showing a portion of the engine-mounted instrumentation assembly; the engine-mounted instrumentation assembly including an outer ring, an inner ring, and instrumentation rake assembly that extends between the outer support ring and the inner support ring; configured to accommodate relative movement between the outer and inner rings; the instrumentation rake assembly including sensors housed in a sensor arm and a piston configured to provide a sealing surface against exhaust pressure;

FIGS. 5a and 5b are a pair of cutaway views showing the instrumentation rake assembly's attachment to the outer support ring, configured to rotate about an outer pin which attaches the sensor housing to a piston in order to accommodate both the thermal expansion of the sensor arm and the movement of the inner support ring relative to the outer support ring;

FIGS. 6a and 6b are a pair of cutaway views showing the instrumentation rake assembly's attachment to the inner support ring, configured to rotate about an inner pin which attaches the sensor arm to the inner support ring;

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
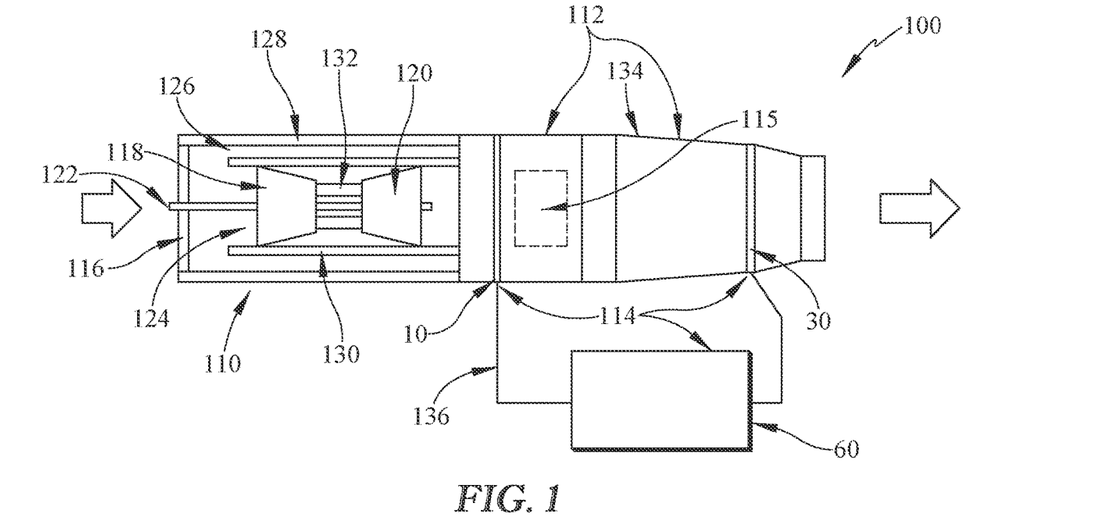
FIG. 1 is a diagrammatic view of a test stand configured to evaluate a test article mounted in the exhaust stream of a gas turbine engine; the test stand including the gas turbine engine, an exhaust system with the test article therein, and an instrumentation system having (i) an engine-mounted instrumentation assembly upstream of the test article, (ii) a dynamic instrumentation assembly downstream of the test article, and (iii) a control/monitoring unit that receives information from the instrumentation assemblies to determine how the test article affects the exhaust stream flow.

A propulsion system test stand 100 for evaluating the performance of gas turbine engine system components is shown diagrammatically in FIG. 1. The test stand 100 includes a gas turbine engine 110, an exhaust system 112, and an instrumentation system 114. The gas turbine engine 110 burns fuel to accelerate air and withdraw mechanical power from expanding gas moving through the gas turbine engine 110. The exhaust system 112 conducts expanding gas out of the gas turbine engine 110 and includes a test article 115, whose effect on the exhaust air is being measured by the instrumentation system 114. The instrumentation system 114 is configured to measure the effect of the test article 115 on various properties of the exhaust system 112 such as pressure and temperature.

In this embodiment, the gas turbine engine 110 includes a fan 116, a compressor 118, a turbine 120, and a combustor 132. The fan 116 and compressor 118 are driven by the turbine 120 through shaft 122. Some portion of the air passing through the fan 116 will go through an engine core 124 and some of the air will travel through an outer bypass duct 126. The outer bypass duct 126 is illustratively defined by a fan case 128 and an engine case 130. The combustor 132 burns fuel to add energy to the air passing through the gas turbine engine 110. The exhaust system 112 is coupled to the gas turbine engine 110 and is configured to direct air from the engine core 124 and bypass duct 126 away from the gas turbine engine 110.

The instrumentation system 114 is configured to measure the effect of the test article 115 on various properties of the exhaust air such as pressure and temperature. The instrumentation system 114 includes an engine-mounted instrumentation assembly 10, a dynamic instrumentation assembly 30, and a control/monitoring unit 60. The engine-mounted instrumentation assembly 10 is coupled to both a stationary part of the gas turbine engine 110 and the exhaust duct 134 upstream of the test article 115. The dynamic instrumentation assembly 30 is coupled to the exhaust duct 134 downstream of the test article 115. A control/monitoring unit 60 is connected via a wiring harness 136 to the engine-mounted instrumentation assembly 10 as well as the dynamic instrumentation assembly 30. The control/monitoring unit 60 is configured to received information about the exhaust flow from both instrumentation assemblies 10, 30.

Figure 2:
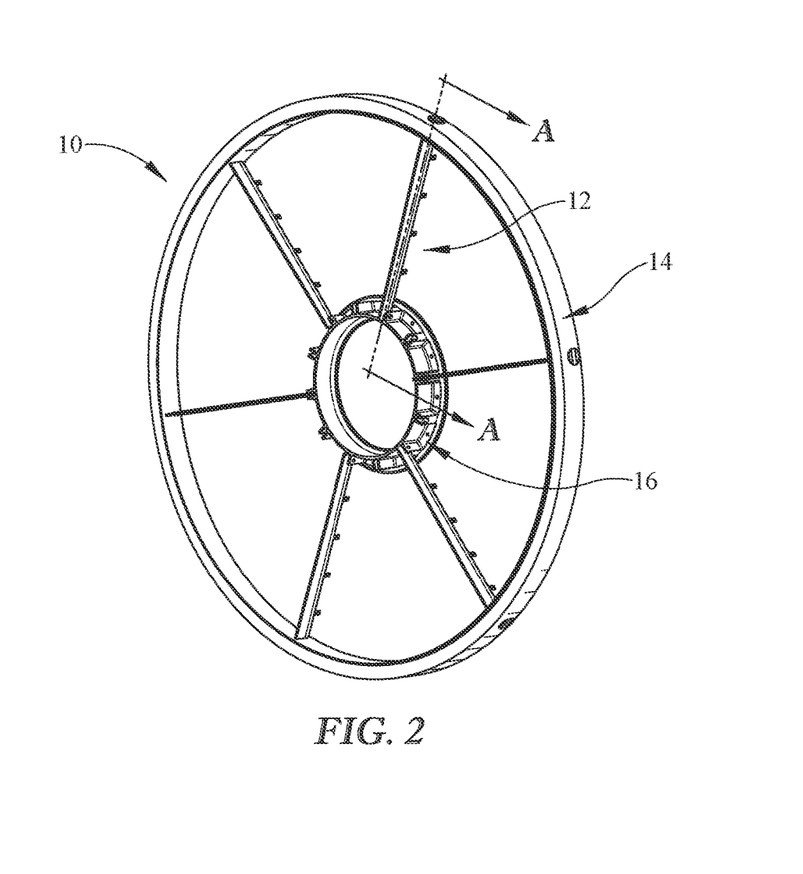
FIG. 2 is a perspective view of the engine-mounted instrumentation assembly which is adapted to take measurements across the entire radial extent of the engine exhaust and to provide a full field array of measurements ahead of test article, the engine-mounted instrumentation assembly is further adapted to accommodate relative movement of components of the gas turbine engine due to uneven expansion and contraction.

The engine-mounted instrumentation assembly 10 is configured to measure exhaust gas and is shown in perspective in FIG. 2. The engine-mounted instrumentation assembly 10 includes a plurality of instrumentation rake assemblies 12 mounted between an outer support ring 14 and an inner support ring 16. The outer support ring 14 is configured to be coupled directly to the exhaust duct 134 and the inner support ring 16 is configured to be coupled directly to a stationary part of the gas turbine engine 110. For example, the inner support ring 16 may be coupled to a tailcone.

Figures 3A, 3B:
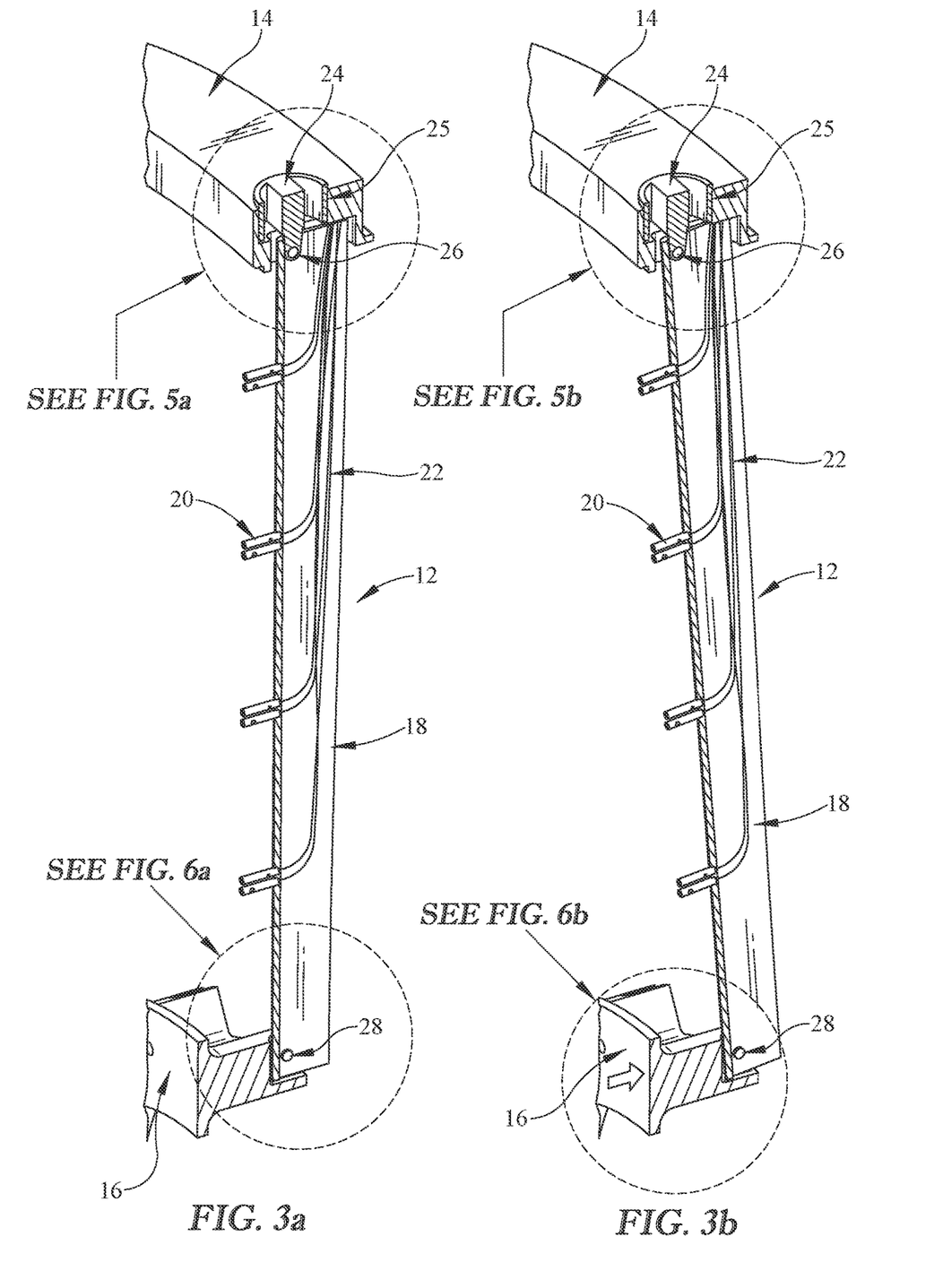
FIG. 3a is a cutaway view showing a portion of the engine-mounted instrumentation assembly, the engine-mounted instrumentation assembly including an outer ring, an inner ring, and instrumentation rake assembly that extends between the outer support ring and the inner support ring, configured to accommodate relative movement between the outer and inner rings, the instrumentation rake assembly including sensors housed in a sensor arm and a piston configured to provide a sealing surface against exhaust pressure and showing the instrumentation rake assembly in its nominal position, the instrumentation rake assembly including sensors housed in a sensor arm and a piston configured to provide a sliding interface to accommodate movement of the sensor arm.
FIG. 3b is a cutaway view showing the instrumentation rake assembly after being displaced due to movement of the inner support ring relative to the outer support ring because of expansion and contraction of components of the gas turbine engine.

The instrumentation rake assembly 12, shown in a cutaway view in FIGS. 3a and 3b, is configured to take measurements of various properties of the air and transmit them back to the control/monitoring unit 60. The instrumentation rake assembly 12 includes a sensor arm 18 supporting a plurality of sensors 20. The signals from the sensors 20 are transmitted via wires 22 out of the instrumentation rake assembly 12 to the control/monitoring unit 60.

The instrumentation rake assembly 12 is further configured to accommodate relative movement of the outer support ring 14 and the inner support ring 16 due to differing thermal expansion without damaging the sensor arm 18. FIG. 3a shows the instrumentation rake assembly 12 in its nominal position while FIG. 3b shows the movement of the sensor arm 18 due to movement of the inner support ring 16 relative to the outer support ring 14.

The sensor arm 18 is pivotably coupled at one end to a piston 24, included in the instrumentation rake assembly 12, with an outer pin 26 as shown as FIG. 3a and FIG. 3b. The sensor arm 18 is further pivotably coupled to the inner support ring 16 with an inner pin 28.

Figure 5A:
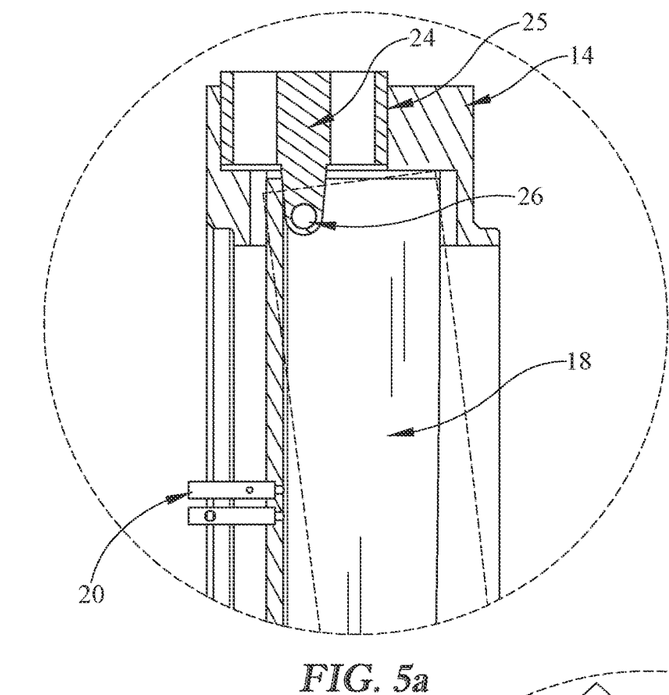
FIG. 5a is a cutaway view showing the instrumentation rake assembly's attachment to the outer support ring, configured to rotate about an outer pin which attaches the sensor housing to a piston in order to accommodate both the thermal expansion of the sensor arm and the movement of the inner support ring relative to the outer support ring, and showing the instrumentation rake assembly in its nominal position.
Figure 5B:
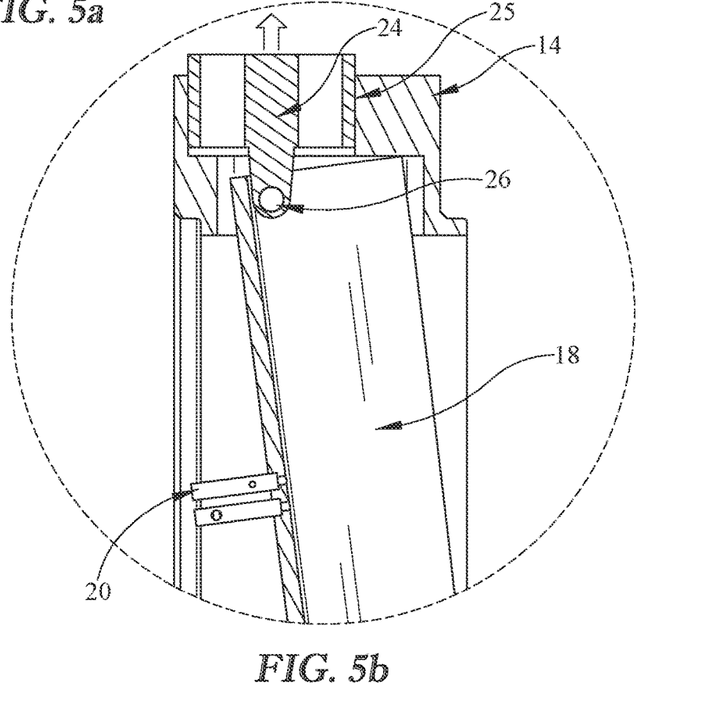
FIG. 5b is a cutaway view showing the instrumentation rake assembly after being displaced by the movement of the inner support ring relative to the outer support ring because of expansion and contraction of components of the gas turbine engine.

The piston 24 moves radially within an instrumentation ring bore 25 inside the outer support ring 14 as shown in FIG. 5a and FIG. 5b. The sensor arm 18 rotates relative to the piston 24 and outer support ring 14 about the outer pin 26. FIG. 5a shows the sensor arm 18 in its nominal position and FIG. 5b shows the sensor arm 18 after being rotated around outer pin 26.

Figures 6A, 6B:
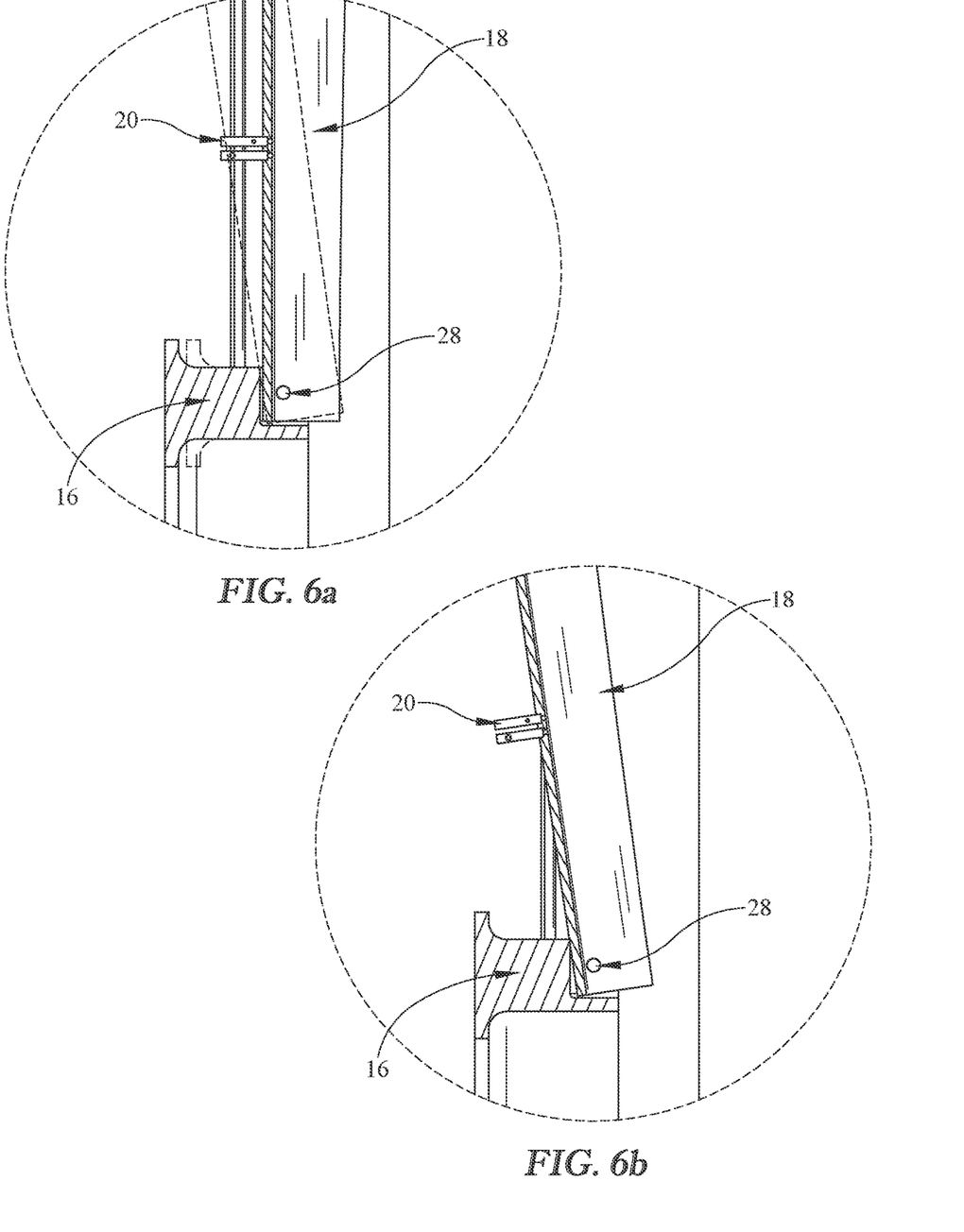
FIG. 6a is a cutaway view showing the instrumentation rake assembly's attachment to the inner support ring, configured to rotate about an inner pin which attaches the sensor arm to the inner support ring, and showing the instrumentation rake assembly in its nominal position.
FIG. 6b is a cutaway view showing the instrumentation rake assembly after being displaced by the movement of the inner support ring relative to the outer support ring because of expansion and contraction of components of the gas turbine engine.

The sensor arm 18 rotates about the inner pin 28 when displaced by movement of the inner support ring 16 as shown in FIG. 6a and FIG. 6b. FIG. 6a shows the sensor arm 18 and inner support ring 16 in their nominal positions and FIG. 6b shows the sensor arm 18 displaced due to the movement of the inner support ring 16.

The combination of the piston 24, outer pin 26, and inner pin 28 allow for the sensor arm 18 to move while still being coupled at both ends, allowing for a full field measurement to be taken across the entire radial extent of the exhaust stream as suggested in FIG. 2. When uneven thermal expansion occurs within the gas turbine engine 110 relative axial and/or radial movement of the inner support ring 16 relative to the outer support ring may be induced. To accommodate this, the sensor arm 18 will rotate about outer pin 26 and inner pin 28, and piston 24 will slide radially within the outer support ring 14.

Figures 4A, 4B:
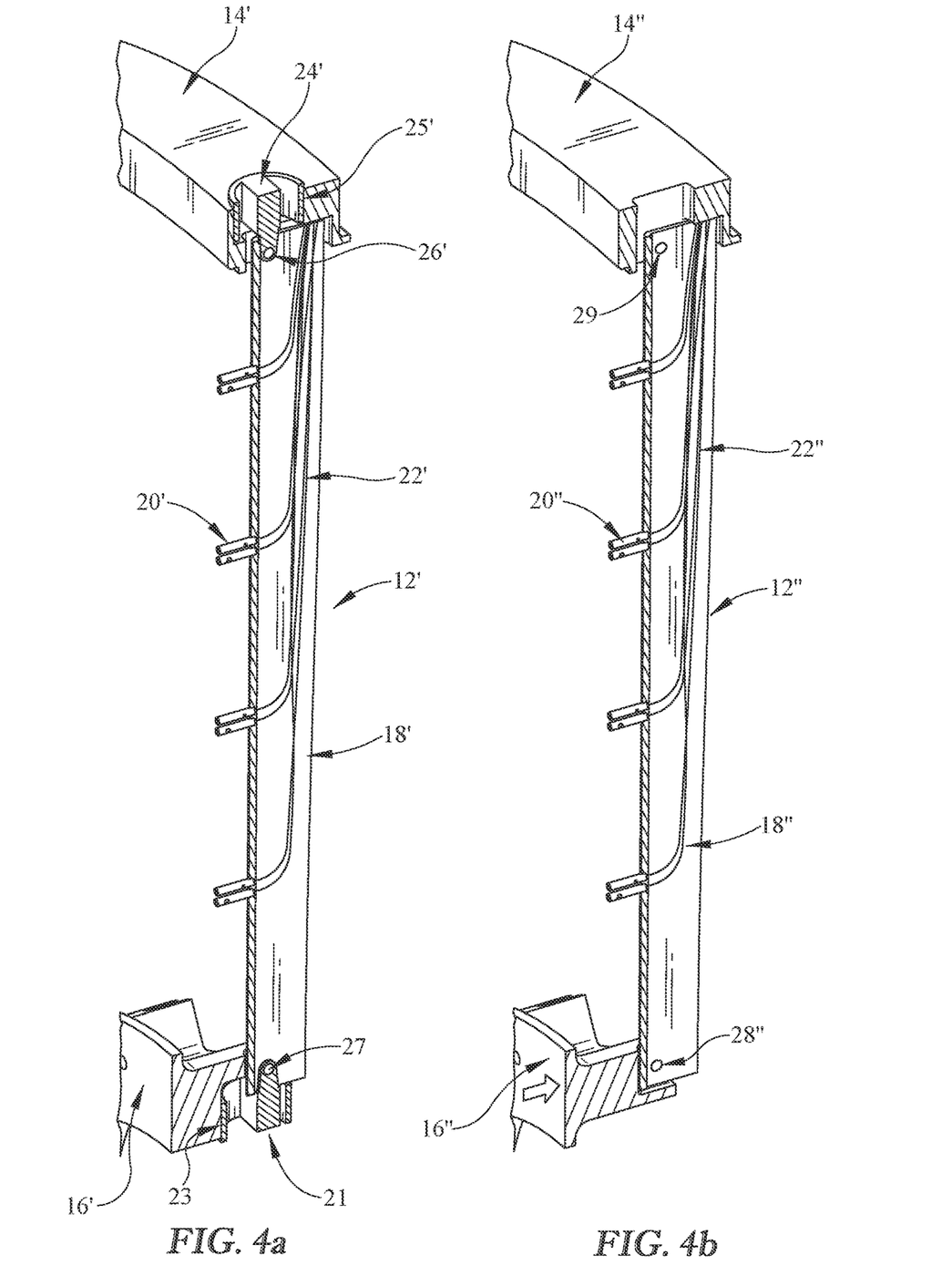
FIG. 4a is a cutaway view showing an second embodiment of the instrumentation rake assembly where the instrumentation rake assembly is attached to the inner and outer support rings with pistons at both ends.
FIG. 4b is a cutaway view showing a third embodiment of the instrumentation rake assembly where the instrumentation assembly is attached to the inner and outer support rings with pins at both ends.

In a second embodiment, the instrumentation rake assembly 12' is adapted for use in the engine-mounted instrumentation assembly 10 and functions in a similar manor to the instrumentation rake assembly 12. Unlike the instrumentation rake assembly 12 above, in the instrumentation rake assembly 12' the sensor arm 18' is pivotably coupled at one end to piston 21, as shown in FIG. 4a. The piston 21 moves radially within an instrumentation ring bore 23 within the inner support ring 16'. The sensor arm 18' rotates relative to the piston 21 and inner support ring 16' about the outer pin 27.

In a third embodiment, the instrumentation rake assembly 12" is adapted for use in the engine-mounted instrumentation assembly 10 and functions in a similar manor to the instrumentation rake assembly 12. Unlike the instrumentation rake assembly 12 above, in the instrumentation rake assembly 12" the sensor arm 18" is pivotably coupled at one end to the outer support ring via outer pin 29. The sensor arm 18" rotates about the outer pin 29 when displaced by movement of the inner support ring 16" as shown in FIG. 4b.

Figures 7, 8:
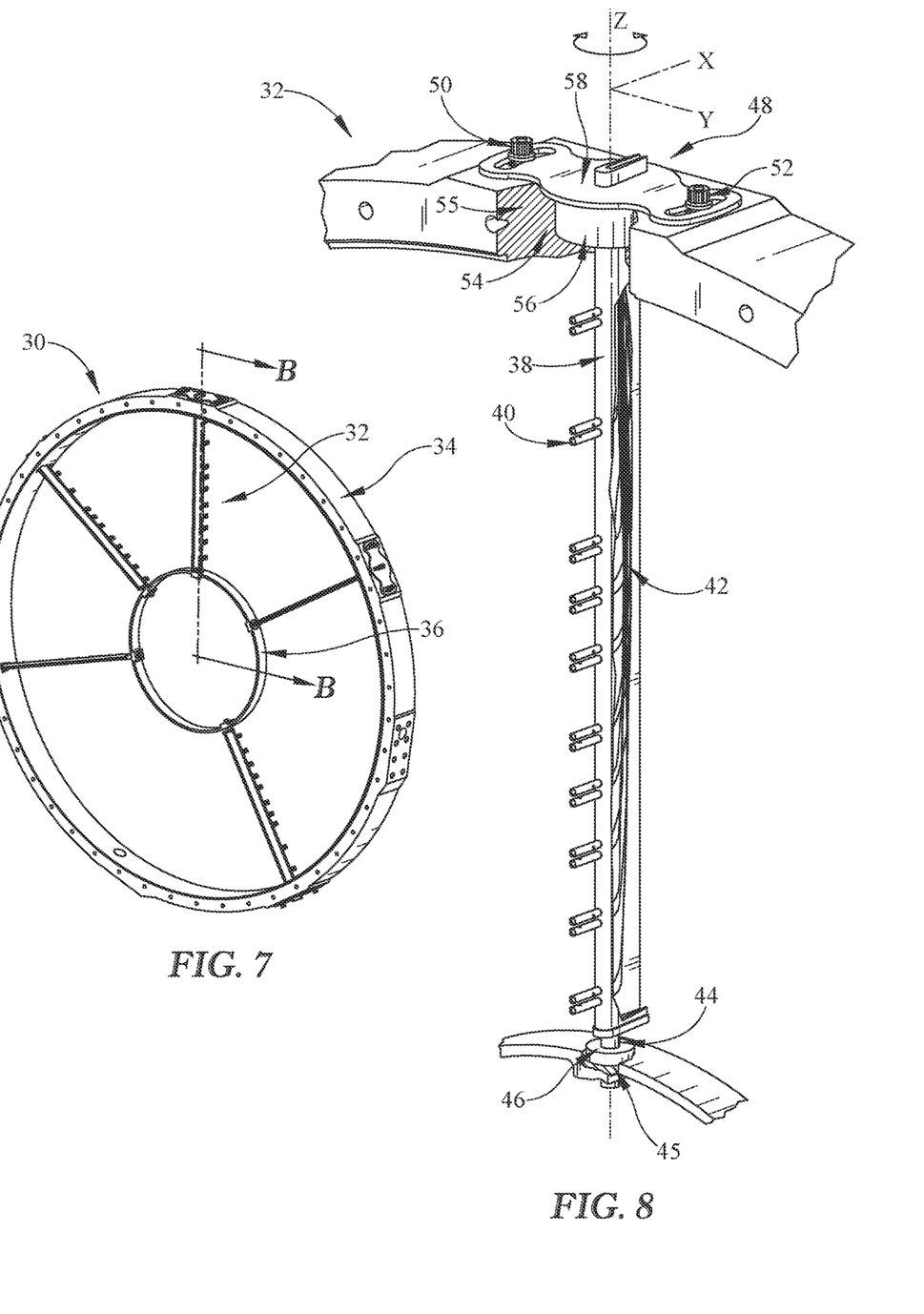
FIG. 7 is a perspective view of the dynamic instrumentation assembly which is adapted to take measurements across the entire radial extent of the engine exhaust and to provide a full field array of measurements after the test article, the dynamic instrumentation assembly further adapted to rotate about its axis in order to measure the non-axial components of the exhaust gas flow.
FIG. 8 is a cutaway view showing an instrumentation rake assembly mounted to both an outer support ring and an inner support ring, configured to rotate about its axis in order to measure non-axial components of the exhaust gas flow, the instrumentation rake assembly including sensors mounted in a sensor arm, a rotation insert, and a sensor arm positioner configured to selectively hold the sensor arm and sensors in a desired orientation relative to the exhaust gas flow.

The dynamic instrumentation assembly 30 is configured to measure exhaust gas and is shown in perspective in FIG. 7. The dynamic instrumentation assembly 30 includes a plurality of instrumentation rake assemblies 32 mounted between an outer support ring 34 and an inner support ring 36. The outer support ring 34 is configured to be coupled directly to the exhaust duct 134 and the inner support ring 36 is configured to support the instrumentation rake assemblies 32 without being directly coupled to any other part of the exhaust system 112.

The instrumentation rake assembly 32, shown in a cutaway view in FIG. 8, is configured to take measurements of various properties of the air and transmit them back to the control/monitoring unit 60. The instrumentation rake assembly 32 includes a sensor arm 38 supporting a plurality of sensors 40. The signals from the sensors 40 are transmitted via wires 42 out of the instrumentation rake assembly 32 to the control/monitoring unit 60.

The instrumentation rake assembly 32 in FIG. 8 is further configured to rotate about an axis Z radial to the exhaust air in order to allow for more accurate measurement of non-linear exhaust air flow. The rotation allows the sensor arm 38 to position the sensors 40 at a user selected angle relative to the direction of the exhaust air flow.

The sensor arm 38 shown in FIG. 8 is rotatively coupled to the inner support ring 36 by attachment rod 44. In this embodiment, the attachment rod 44 passes through the inner support ring 36. In this embodiment, a rotation insert 46 sitting within an instrumentation ring bore 45 of the inner support ring 36 supports the attachment rod 44 and provides a low friction surface for rotative bearing engagement within the inner support ring 36. In other embodiments, the attachment rod 44 could sit directly within the instrumentation ring bore 45 within the inner support ring 36.

The sensor arm 38 is further rotatively coupled to the outer support ring 34 with the sensor arm positioner 48. The sensor arm positioner 48 is configured to selectively hold the sensor arm 38 and sensors 40 in a user selected orientation relative to exhaust air flow.

The sensor arm positioner 48 includes threaded inserts 50 which allow the thumb screws 52 to lock the position of the rake angle yolk 54. The rake angle yolk 54 includes a rotation disk 56 which sits within an instrumentation ring bore 55 in the outer support ring 34 and provides a sealing surface against exhaust air. In this configuration, the rotation disk 56 is coupled to the rake angle lock plate 58. The sensor arm 38 passes through both the rotation disk 56 and the rake angle lock plate 58.

The control/monitoring unit 60 is configured to receive signals from the engine-mounted instrumentation assembly 10 and the dynamic instrumentation assembly 30 over the wiring harness 136. The signal from the sensors 20, 40 is received by a processor converted into data and stored in memory. The data can then be accessed from the control/monitoring unit 60 either remotely or directly by test personnel.

In operation a user mounts the test article 115 to the exhaust of the gas turbine engine 110. This test article could be, but is not limited to, a device for mixing the hot core exhaust air with the cooler fan bypass air. This mixing reduces the velocity of the core exhaust air, which reduces the amount of noise produced. The mixing also reduced the temperature of the core exhaust air. The lower temperature reduces the heat signature of the engine.

In order to measure the impact that the test article 115 has on the exhaust air, it can be helpful for measurements to be taken upstream and downstream of the test article 115. The engine-mounted instrumentation assembly is pivotably coupled to both the engine core 124 and the fan case 128. The higher temperature of the core air in comparison to the fan bypass air will cause the engine core 124 to expand axially more than the fan case 128. The engine-mounted instrumentation assembly 10 accommodates this relative movement and sends measurements of the air to the control/monitoring unit 60.

After the exhaust air passes over the test article 115 the dynamic instrumentation assembly 30 sends measurements of the air to the control/monitoring unit 60. The test article 115 may induce swirl or otherwise cause the exhaust air to encounter the sensors 40 at an oblique angle. The instrumentation rake assembly 32 is configured to rotate about an axis Z radial in order to accommodate this non-linear flow and allow sensors to encounter the air at the desired angle.

The control/monitoring unit 60 stores in memory the measurements taken by the engine-mounted instrumentation assembly 10 and the dynamic instrumentation assembly 30. After accessing this data the user or control/monitoring unit 60 can adjust the angle of the instrumentation rake assembly 32. The full array of sensors on both instrumentation assemblies 10, 30 allow the user to understand the impact of the test article 115 on the exhaust flow.

In order to improve the performance of gas turbine engines and rocket motors, it is frequently desired to measure temperatures, pressures and other parameters in the hot, high energy exhaust of these devices. Typically, the required probes are mounted on cantilevered rakes. These rakes, only supported on one end, can be prone to vibration and can be necessarily short due to the high bending loads and the low allowable stress of the rake material at high exhaust temperatures. Instrumentation rakes, like the sensor arms 18 and 38, supported at both ends have lower bending stresses and vibrate less.

As the hot instrumentation rake expands and contracts, the piston 24 rides up and down in the instrumentation ring bore 25. As the hot engine 110 expands axially relative to the cooler instrumentation ring, the instrumentation rake rocks back and forth on the upper and lower rake pins.

Materials for the piston and instrumentation ring (outer support ring) if the temperatures are cool enough could be, but are not limited to, high strength steels such as 17-4PH or SS AISI 347. If temperatures are too high for those, Ni alloys such as IN718, IN625 or Hast-X could also be used. Materials for the instrumentation rake (sensor arm) could be, but are not limited to, high temperature high strength Ni alloys such as Waspalloy or Mar M247. Materials for the rake base mount (inner support ring) could be, but are not limited to, Ni alloys such as IN718, IN625, or Hast-X.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A propulsion system test stand configured to measure properties of an engine exhaust stream, the propulsion system test stand comprising
    a gas turbine engine configured to discharge exhaust gas in an aft direction along a central axis of engine rotation,
    an exhaust duct arranged radially outward of the central axis of engine rotation and configured to conduct the exhaust gas as it moves in the aft direction along the central axis of engine rotation, and
    an engine-mounted instrumentation assembly including an outer support ring coupled to the exhaust duct, an inner support ring positioned radially inward of the outer support ring and coupled to the gas turbine engine, and a plurality of instrumentation rake assemblies that extend from the outer support ring to the inner support ring so as to be coupled at both the outer support ring and the inner support ring allowing for a field measurement across locations from the outer support ring to the inner support ring,
    wherein each of the plurality of instrumentation rake assemblies includes a sensor arm, at least one sensor coupled to the sensor arm configured to detect properties of the exhaust gas, and mount means for coupling the sensor arm to both the outer support ring and the inner support ring to accommodate movement of the inner support ring, in the aft direction along the central axis of engine rotation, relative to the outer support ring, the movement of the inner support ring caused by thermal expansion of the gas turbine engine along the central axis of engine rotation greater than that of the exhaust duct during operation of the propulsion system test stand.

2. The propulsion system test stand of claim 1, wherein the mount means includes an outer pivot connection that supports the sensor arm to pivot about an outer pivot axis tangent to an outer diameter around the central axis of engine rotation and an inner pivot connection that supports the sensor arm to pivot about an inner pivot axis tangent to an inner diameter around the central axis of engine rotation, the inner diameter being arranged radially inward of the outer diameter.

3. The propulsion system test stand of claim 2, wherein the outer pivot connection includes an outer pin that extends along the outer pivot axis and the inner pivot connection includes an inner pin that extends along the inner pivot axis.

4. The propulsion system test stand of claim 1, wherein the mount means further provides for coupling the sensor arm to at least one of the outer support ring and the inner support ring to accommodate radial expansion and contraction of the inner support ring around the central axis of engine rotation relative to the outer support ring caused by thermal expansion of the gas turbine engine relative to the central axis of engine rotation greater than that of the exhaust duct during operation of the propulsion system test stand.

5. The propulsion system test stand of claim 4, wherein the mount means includes a first slide connection coupled to the sensor arm via a first pivot connection that supports the sensor arm to pivot about a first pivot axis tangent to a first diameter around the central axis of engine rotation, and the first slide connection supports the first pivot connection for movement in a radial direction relative to the central axis of engine rotation.

6. The propulsion system test stand of claim 5, wherein the first slide connection includes a piston received in a bore formed in one of the outer support ring and the inner support ring.

7. The propulsion system test stand of claim 6, wherein the pivot connection includes a pin that extends along the pivot axis.

8. The propulsion system test stand of claim 5, wherein the mount means includes a second slide connection coupled to the sensor arm via a second pivot connection that supports the sensor arm to pivot about a second pivot axis tangent to a second diameter around the central axis of engine rotation, and the second slide connection supports the second pivot connection for movement in the radial direction relative to the central axis of engine rotation.

9. The propulsion system test stand of claim 8, wherein the first slide connection includes a first piston received in a bore formed in the outer support ring and the second slide connection includes a second piston received in a bore formed in the inner support ring.

10. The propulsion system test stand of claim 9, wherein the first pivot connection includes a first pin that extends along the first pivot axis, the first pivot axis configured to move with the first piston, and the second pivot connection includes a second pin that extends along the second pivot axis, the second pivot axis configured to move with the second piston.

11. The propulsion system test stand of claim 4, wherein the mount means includes an outer pivot connection that supports the sensor arm to pivot about an outer pivot axis tangent to an outer diameter around the central axis of engine rotation and an inner pivot connection that supports the sensor arm to pivot about an inner pivot axis tangent to an inner diameter around the central axis of engine rotation, the inner diameter being arranged radially inward of the outer diameter.

12. The propulsion system test stand of claim 11, wherein the outer pivot connection includes an outer pin that extends along the outer pivot axis and an inner pin that extends along the inner pivot axis.

13. The propulsion system test stand of claim 4, wherein the exhaust duct is included as part of an exhaust system, the exhaust system further includes a test article mounted in the exhaust stream and configured to affect the flow of the exhaust gas, and the engine-mounted instrumentation assembly is located forward of the test article along the central axis of engine rotation.

14. The propulsion system test stand of claim 13, further comprising a dynamic instrumentation assembly located aft of the test article along the central axis of engine rotation configured to measure properties of an engine exhaust stream, the dynamic instrumentation assembly including an outer support ring of the dynamic instrumentation assembly coupled to the exhaust duct, an inner support ring of the dynamic instrumentation assembly positioned radially inward of the outer support ring of the dynamic instrumentation assembly and free to move independent of the gas turbine engine, and a plurality of instrumentation rake assemblies of the dynamic instrumentation assembly that extend from the outer support ring of the dynamic instrumentation assembly to the inner support ring of the dynamic instrumentation assembly so as to be coupled at both the outer support ring of the dynamic instrumentation assembly and the inner support ring of the dynamic instrumentation assembly allowing for a field measurement across locations from the outer support ring of the dynamic instrumentation assembly to the inner support ring of the dynamic instrumentation assembly, wherein each of the plurality of instrumentation rake assemblies of the dynamic instrumentation assembly includes a sensor arm of the dynamic instrumentation assembly, at least one sensor of the dynamic instrumentation assembly coupled to the sensor arm of the dynamic instrumentation assembly configured to detect properties of the exhaust gas, and mount means for coupling the sensor arm to both the outer support ring of the dynamic instrumentation assembly and the inner support ring of the dynamic instrumentation assembly to accommodate rotation of the sensor arm of the dynamic instrumentation assembly along an axis extending in the radial direction relative to the central axis of engine rotation so as to enable the sensors of the dynamic instrumentation assembly to encounter the exhaust air at a desired angle.

15. An instrumentation assembly configured to measure properties of an engine exhaust stream, the instrumentation assembly comprising
an outer support ring that extends around a central axis,
an inner support ring arranged radially inward of the outer support ring around the central axis,
a plurality of instrumentation rake assemblies that extend from the outer support ring to the inner support ring across an annular passageway defined between the outer support ring and the inner support ring configured to carry the engine exhaust stream,
wherein each of the plurality of instrumentation rake assemblies includes a sensor arm, at least one sensor coupled to the sensor arm, an outer pivot connection that supports the sensor arm to pivot about an outer pivot axis tangent to an outer diameter around the central axis and an inner pivot connection that supports the sensor arm to pivot about an inner pivot axis tangent to an inner diameter around the central axis, the inner diameter being arranged radially inward of the outer diameter.

16. The instrumentation assembly of claim 15, wherein the outer pivot connection includes an outer pin that extends along the outer pivot axis and the inner pivot connection includes an inner pin that extends along the inner pivot axis.

17. An instrumentation assembly configured to measure properties of an engine exhaust stream, the instrumentation assembly comprising
an outer support ring that extends around a central axis,
an inner support ring arranged radially inward of the outer support ring around the central axis,
a plurality of instrumentation rake assemblies that extend from the outer support ring to the inner support ring across an annular passageway defined between the outer support ring and the inner support ring configured to carry the engine exhaust stream,
wherein each of the plurality of instrumentation rake assemblies includes a sensor arm, at least one sensor coupled to the sensor arm, a first slide connection coupled to the sensor arm via a first pivot connection that supports the sensor arm to pivot about a first pivot axis tangent to a first diameter around the central axis, and the first slide connection supports the first pivot connection for movement in a radial direction relative to the central axis.

18. The instrumentation assembly of claim 17, wherein the first slide connection includes a piston received in a bore formed in one of the outer support ring and the inner support ring and the pivot connection includes a first pin that extends along the first pivot axis.

19. The instrumentation assembly of claim 17, further including a second slide connection coupled to the sensor arm via a second pivot connection that supports the sensor arm to pivot about a second pivot axis tangent to a second diameter around the central axis, and the second slide connection supports the second pivot connection for movement in the radial direction relative to the central axis.

20. The instrumentation assembly of claim 19, wherein the first slide connection includes a first piston received in a bore formed in the outer support ring, the first pivot connection includes a first pin that extends along the first pivot axis, the second slide connection includes a second piston received in a bore formed in the inner support ring, and the second pivot connection includes a second pin that extends along the second pivot axis.

\* \* \* \* \*